E. A. & A. C. Apgar.
Map & Chart-Holder.
Nº 75343. Patented Mar. 10, 1868.

Witnesses
J. A. Lippincott
W. W. Hatch

Inventors
E. A. Apgar
A. C. Apgar

UNITED STATES PATENT OFFICE.

E. A. APGAR AND A. C. APGAR, OF TRENTON, NEW JERSEY.

IMPROVEMENT IN MAP AND CHART HOLDERS.

Specification forming part of Letters Patent No. 75,343, dated March 10, 1868.

*To all whom it may concern:*

Be it known that we, E. A. APGAR and A. C. APGAR, of Trenton, county of Mercer, State of New Jersey, have invented a new and useful Map, Chart, and Diagram Holder; and we do hereby declare the same is fully described and represented in the following specification and the accompanying drawings and model.

The nature of our invention consists in the employment of a device by means of which maps, charts, or other surfaces can be protected from the dust and light, and be made to open and close like a book, with a tendency to remain shut when closed and to lie flat when open, and also to show double surface when folded in the center.

Figure 1:
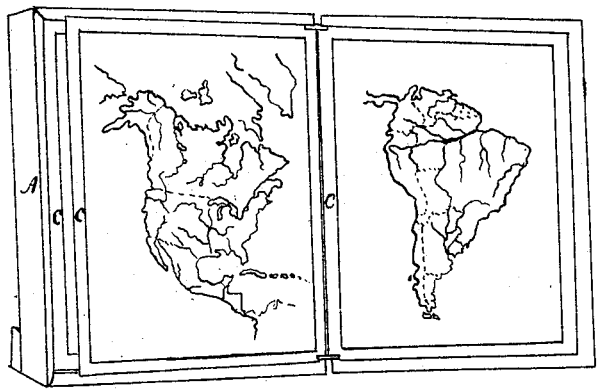

In the accompanying drawings, which form part of this specification, Figure 1 represents the map, chart, and diagram holder complete, with the maps mounted upon frames. A is the case, B the door, and C the frames.

Figure 2:
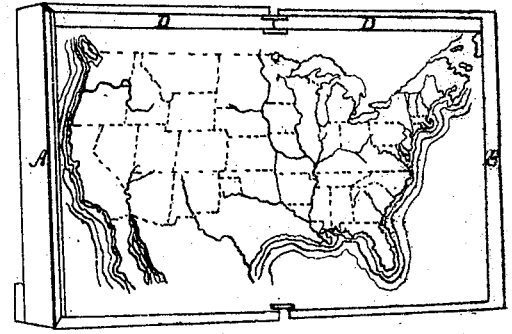

Fig. 2 represents the same, with a double map hung upon straps at its upper edge. A is the case, B the door, and D the straps.

Figure 3:
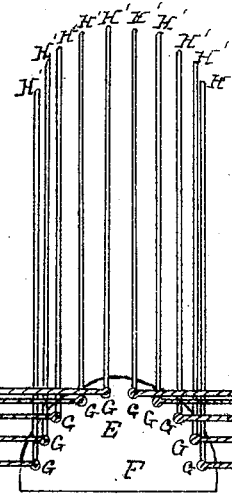

Fig. 3 represents the plan of the self-adjusting rotary compound hinge by means of which the objects of our device are accomplished. E is the rotating disk, and F the pivot upon which it rotates. G G are the centers around which the frames or straps turn. H H are the frames or straps to which the maps are fastened as they appear when opened at the center. H' H' represent the same as they appear when closed.

The purposes for which the self-adjusting rotary compound hinge is used, in connection with the frames or straps, are, first, to hold the maps firm; second, to enable the maps to be opened and show flat at any place; and, third, to show a double-sized map when necessary.

We therefore distinctly claim as original with us and desire to secure by Letters Patent—

The self-adjusting rotary compound hinge, as described, and for the purposes set forth.

E. A. APGAR.
A. C. APGAR.

Witnesses:
J. A. LIPPINCOTT,
R. R. HATCH.